United States Patent
Soczka-Guth et al.

(10) Patent No.: US 7,285,325 B2
(45) Date of Patent: Oct. 23, 2007

(54) MEMBRANES HAVING IMPROVED MECHANICAL PROPERTIES, FOR USE IN FUEL CELLS

(75) Inventors: Thomas Soczka-Guth, Schelklingen (DE); Joachim Kiefer, Idstein (DE); Frauke Jordt, Eppstein (DE)

(73) Assignee: BASF Fuel Cell GmbH (DE)

( * ) Notice: Subject to any disclaimer, the term of this patent is extended or adjusted under 35 U.S.C. 154(b) by 0 days.

(21) Appl. No.: 10/399,514

(22) PCT Filed: Oct. 20, 2001

(86) PCT No.: PCT/EP01/12147

§ 371 (c)(1), (2), (4) Date: Feb. 10, 2004

(87) PCT Pub. No.: WO02/36249

PCT Pub. Date: May 10, 2002

(65) Prior Publication Data

US 2004/0131909 A1    Jul. 8, 2004

(30) Foreign Application Priority Data

Oct. 21, 2000    (DE) ................ 100 52 242

(51) Int. Cl.
  B32B 27/18    (2006.01)
  C08J 5/20    (2006.01)
  H01G 9/02    (2006.01)
  H01M 8/10    (2006.01)

(52) U.S. Cl. ............ 428/220; 428/411.1; 429/33; 429/41; 252/62.2; 525/417; 525/420; 525/435; 525/534; 525/535

(58) Field of Classification Search ............ 429/33, 429/41; 252/62.2; 521/28; 525/471, 420, 525/435, 534, 535; 428/213, 220, 411.1
See application file for complete search history.

(56) References Cited

U.S. PATENT DOCUMENTS

| | | | |
|---|---|---|---|
| 4,260,652 A | 4/1981 | Taketani et al. ............ 427/245 |
| 5,525,436 A | 6/1996 | Savinell et al. | |
| 5,599,639 A | 2/1997 | Sansone et al. ................ 429/33 |
| 5,688,614 A * | 11/1997 | Li et al. .................... 429/310 |
| 5,902,876 A | 5/1999 | Murata et al. | |
| 6,723,757 B1 * | 4/2004 | Kerres et al. ................ 521/27 |

FOREIGN PATENT DOCUMENTS

| | | |
|---|---|---|
| DE | 198 17 374 | 10/1999 |
| EP | 0 816 415 | 1/1998 |
| WO | WO 02/36661 | 5/2002 |

OTHER PUBLICATIONS

English translation of DE 198 17 374 A1, Oct. 1999.*

* cited by examiner

Primary Examiner—Ramsey Zacharia
(74) Attorney, Agent, or Firm—Connolly Bove Lodge & Hutz LLP

(57) ABSTRACT

An acid-doped, single-layer or multilayer polymer membrane comprising at least one layer A of a polymer blend with contains:

a) from 0.1 to 99.9% by weight of one or more polymers comprising recurring azole units of the formula 1A and/or 1B:

$$\left[ \begin{array}{c} N \\ \| \\ C \\ | \\ X \end{array} \begin{array}{c} N \\ \| \\ Ar \\ \end{array} \begin{array}{c} \| \\ C \\ | \\ X \end{array} - Ar^1 \right]$$ (1A)

$$\left[ \begin{array}{c} N \\ \| \\ C \\ | \\ X \end{array} Ar^2 \right]$$ (1B)

wherein the radicals Ar, $Ar^1$, and $Ar^2$ are tetravalent, divalent or trivalent aromatic or heteroaromatic groups and the radicals X are each and oxygen atom, a sulfur atom or an amino group bearing a hydrogen atom, a 1-20 carbon group, in admixture with b) from 99.9 to 0.1% by weight of a polysulfone containing recurring unit having no sulfonic acid groups.

20 Claims, No Drawings

MEMBRANES HAVING IMPROVED MECHANICAL PROPERTIES, FOR USE IN FUEL CELLS

RELATED APPLICATIONS

This application claims benefit to and is a Rule 1.371 filing of PCT application No. PCT/EP01/12147 filed Oct. 20, 2001, now published WO 02/036249, which claims benefit to German application 100 52 242.4 filed Oct. 21, 2000.

Acid-doped, single-layer or multilayer polymer membrane having layers comprising polymer blends comprising polymers having recurring azole units, process for producing such polymer membranes and their use.

The present invention concerns the field of polymer membranes. In particular, the invention relates to an acid-doped polymer membrane. In addition, the invention relates to a process for preparing the doped polymer membrane and to its use.

The polymer membrane which has been doped according to the invention can be used in a variety of ways. Owing to its excellent mechanical properties, it is of particular importance as a polymer membrane in fuel cells.

Polyazole membranes for use in fuel cells are already known. The basic membranes are doped with concentrated phosphoric acid or sulfuric acid and serve as proton conductors in polyelectrolyte membrane fuel cells (PEM fuel cells). Such membranes allow the membrane electrode unit (MEE) to be operated at from 100° C. to 200° C. and in this way significantly increase the tolerance of the catalyst to the carbon monoxide formed as by-product in reforming, so that gas preparation or gas purification is significantly simplified.

Disadvantages of these membranes are their mechanical instability with a low E modulus, a low tear strength and a low upper flow limit and also their relatively high permeability to hydrogen and oxygen.

Kerres, J. et al. (Kerres, Jochen; Ullrich, Andreas; Meier, Frank; Häring, Thomas "*Synthesis and characterization of novel-acid-base polymer blends for application in membrane fuel cells*" Solid State Ionics 125, 243 to 249, 1999) provide membranes of sulfonated polyether ether ketone sPEEK ®Victrex or polyether sulfone sPSU ®Udel and PSU ®Udel which has been diaminated in the ortho position relative to the sulfone bridge, poly(4-vinylpyridine), poly (benzimidazole) PBI ®Celazole or poly(ethylenimine) PEI. These membranes display good proton conductivity at an ion exchange capacity IEC of 1 (IEC=meq of $SO_3H$/g of dry membrane) and a good thermal stability.

However, they have the disadvantage that the conductivity of the membranes breaks down under atmospheric pressure above 100° C. due to the loss of water. For this reason, these membranes cannot be used in fuel cells above 100° C. under atmospheric pressure.

In view of the prior art, it is an object of the present invention to provide a doped polymer membrane having improved properties. The polymer membrane of the invention should display good proton conductivities and a low permeability to hydrogen and oxygen.

A further object is to provide a doped polymer membrane which can be used in fuel cells. In particular, the doped polymer membrane should be suitable for use in fuel cells above 100° C. under atmospheric pressure.

It is also an object of the invention to provide a process for producing the doped polymer membrane, which process can be carried out in a simple way, inexpensively and on an industrial scale.

These and further objects which have not been explicitly mentioned but can be readily derived or concluded from the relationships discussed briefly here are achieved by an acid-doped polymer membrane having all the features of claim 1. Advantageous embodiments of the doped polymer membrane of the invention are claimed in the subordinate claims which refer back to claim 1. A process for producing the doped polymer membrane of the invention is described in the process claim, while the claims in the use category claim preferred uses of a polymer membrane which has been doped according to the invention.

Provision of an acid-doped, single-layer or multilayer polymer membrane comprising at least one layer A of a polymer blend comprising a) from 0.1 to 99.9% by weight of one or more polymers comprising recurring azole units of the formula 1A and/or 1B:

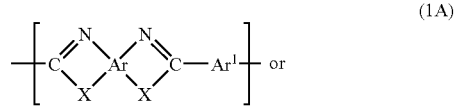

where the radicals Ar, $Ar^1$ and $Ar^2$ are tetravalent, divalent or trivalent aromatic or heteroaromatic groups and the radicals X, which are identical within a repeating unit, are each an oxygen atom, a sulfur atom or an amino group bearing a hydrogen atom, a group having 1-20 carbon atoms, preferably a branched or unbranched alkyl or alkoxy group, or an aryl group as further radical, in admixture with b) from 99.9 to 0.1% by weight of a polysulfone comprising recurring units of the formula 2A, 2B, 2C, 2D, 2E, 2F and/or 2G and having no sulfonic acid groups:

(2A)

(2B)

(2C)

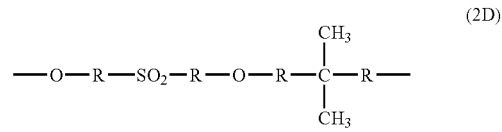
(2D)

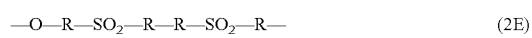
(2E)

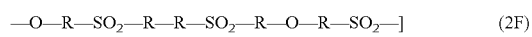
(2F)

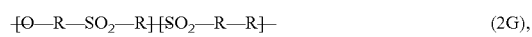
(2G), where the radicals R are identical or different and are each, independently of one another, 1,2-phenylene, 1,3-phenylene, 1,4-phenylene, 4,4'-biphenyl, a divalent radical of a heteroaromatic, a divalent radical of a $C_{10}$-aromatic and/or a divalent radical of a $C_{14}$-aromatic, makes it possible, in a manner which could not readily have been foreseen, to obtain a doped polymer membrane having improved mechanical properties, in particular an increased E modulus and improved fracture strength.

At the same time, the doped polymer membranes of the invention display a series of further advantages. These include, inter alia:

The doped polymer membranes display good proton conductivities.

The doped polymer membranes have only a low permeability to hydrogen and oxygen.

Even extremely thin, doped polymer membranes having a total thickness in the range from 10 to 100 μm have sufficiently good material properties at 100° C., in particular a very high mechanical stability and a low permeability to hydrogen and oxygen.

The property profile of the doped polymer membrane can be improved further by means of a multilayer structure.

The doped polymer membrane is suitable for use in fuel cells above 100° C., in particular under atmospheric pressure.

Partial replacement of the comparatively expensive polyazole by comparatively cheap polysulfone provides a doped polymer membrane which is cheaper to produce.

The doped polymer membrane can be produced in a simple way and on an industrial scale.

According to the present invention, the polymer membrane comprises at least one layer A of a polymer blend which comprises from 0.1 to 99.9% by weight of one or more polymers comprising recurring azole units of the formula 1A and/or 1B:

$$\left[\begin{array}{c}N\diagup\diagdown N\\C\diagdown\diagup C-Ar^1\\X\quad Ar\quad X\end{array}\right] \text{ or} \tag{1A}$$

$$\left[\begin{array}{c}N\\C\diagdown Ar^2\\X\end{array}\right], \tag{1B}$$

The radicals Ar, Ar¹ and Ar² are tetravalent, divalent or trivalent aromatic or heteroaromatic groups which may each have one or more rings. Preferred groups are derived from benzene, naphthalene, biphenyl, diphenyl ether, diphenylmethane, diphenyldimethylmethane, bisphenone, diphenyl sulfone, quinoline, pyridine, anthracene and phenanthrene, which may also be substituted. Ar¹ can have any substitution pattern; in the case of phenylene, Ar¹ can be, for example, ortho-, meta- or para-phenylene. Particularly preferred groups are derived from benzene and biphenyl which may also be substituted.

The radicals X are each an oxygen atom (benzoxazole unit), a sulfur atom (benzothiazole unit) or an amino group (benzimidazole unit) bearing a hydrogen atom, a group having 1-20 carbon atoms, preferably a branched or unbranched alkyl or alkoxy group, or an aryl group as further radical. Preferred alkyl groups are short-chain alkyl groups having from 1 to 4 carbon atoms, e.g. methyl, ethyl, n- or i-propyl and t-butyl groups. Preferred aromatic groups are phenyl or naphthyl groups. The alkyl groups and the aromatic groups may be substituted. Preferred substituents are halogen atoms such as fluorine, amino groups or short-chain alkyl groups such as methyl or ethyl groups.

If polyazoles comprising recurring units of the formula (1A) are used for the purpose of the present invention, the radicals X should be identical within a recurring unit.

A polyazole used for the purposes of the invention can in principle comprise different recurring units which, for example, differ in their radical X. However, it preferably has only identical recurring units.

In a preferred embodiment of the present invention, the polymer comprising recurring azole units is a copolymer comprising at least two units of the formula (1A) and/or (1B) which differ from one another.

In a particularly preferred embodiment of the present invention, the polymer comprising recurring azole units is a polyazole consisting of only units of the formula (1A) and/or (1B).

The number of recurring azole units in the polymer is preferably greater than or equal to 10. Particularly preferred polymers contain at least 100 recurring azole units.

For the purposes of the present invention, preference is given to using polymers comprising recurring benzimidazole units. An example of an extremely advantageous polymer comprising recurring benzimidazole units is represented by the formula (1C):

$$\left[\begin{array}{c}\text{(benzimidazole-phenylene structure)}\end{array}\right]_n \tag{1C}$$

where n is an integer greater than or equal to 10, preferably greater than or equal to 100.

According to the present invention, the polymer blend comprises from 99.9 to 0.1% by weight of a polysulfone which contains no sulfonic acid groups. The polysulfone comprises recurring units having linking sulfone groups corresponding to the formulae 2A, 2B, 2C, 2D, 2E, 2F and/or 2G:

$$-O-R-SO_2-R- \tag{2A}$$

$$-O-R-SO_2-R-O-R- \tag{2B}$$

$$-O-R-SO_2-R-O-R-R- \tag{2C}$$

$$-O-R-SO_2-R-O-R-\underset{\underset{CH_3}{|}}{\overset{\overset{CH_3}{|}}{C}}-R- \tag{2D}$$

$$-O-R-SO_2-R-R-SO_2-R- \tag{2E}$$

$$-O-R-SO_2-R-R-SO_2-R-O-R-SO_2-] \tag{2F}$$

$$-[O-R-SO_2-R]-[SO_2-R-R]- \tag{2G},$$

where the radicals R are identical or different and are each, independently of one another, 1,2-phenylene, 1,3-phenylene, 1,4-phenylene, 4,4'-biphenyl, a divalent radical of a heteroaromatic, a divalent radical of a $C_{10}$-aromatic and/or a divalent radical of a $C_{14}$-aromatic. Examples of heteroaromatics are pyridine and quinoline. An example of a $C_{10}$-aromatic is naphthaline, and an example of a $C_{14}$-aromatic is phenanthrene.

Polysulfones which are preferred for the purposes of the present invention include homopolymers and copolymers, for example random copolymers such as ®Victrex 720 P and ®Astrel. Particularly preferred polysulfones are:
®Victrex 200 P
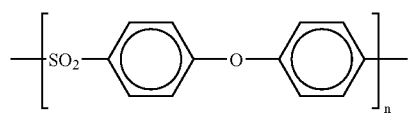
(2H)
®Victrex 720 P
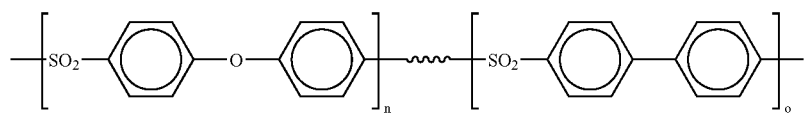
where n > o
(2I)
®Radel
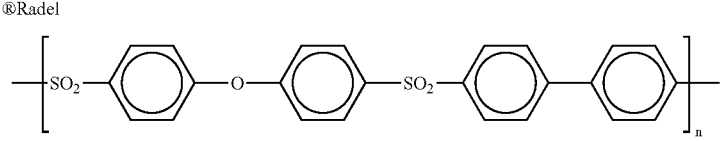
(2J)
®Radel R
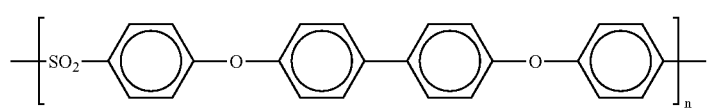
(2K)
®Victrex HTA
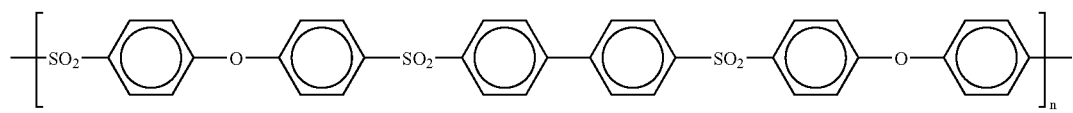
(2L)
®Astrel
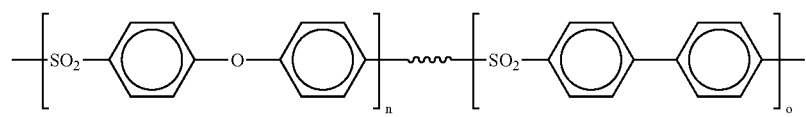
where n < o
(2M)
®Udel
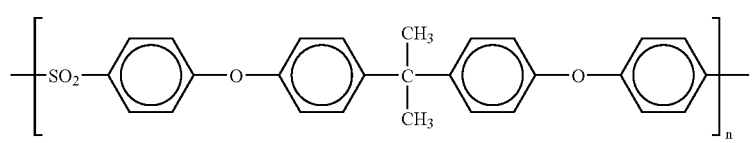
(2N)

A very particularly preferred polysulfone is ®Radel R.

The polysulfones which can be used according to the invention may, if desired, be substituted. However, they must contain neither protonated sulfonic acid groups

$$—SO_3H \qquad (3),$$

nor protonatable sulfonic acid salt groups

$$SO_3^- M^+ \qquad (4),$$

where M$^+$ is an inorganic or organic cation, because these can impair the mechanical properties of the doped polymer membrane.

In a preferred embodiment of the present invention, the polysulfones are unsubstituted.

In another preferred embodiment of the present invention, the number average molecular weight of the polysulfones is greater than 30 000 g/mol.

The polymer membranes of the invention are doped. For the purposes of the present invention, doped polymer membranes are polymer membranes which due to the presence of dopants display an increased proton conductivity compared to the undoped polymer membranes. Dopants for the polymer membranes of the invention are acids. In this context, acids include all known Lewis and Brønsted acids, preferably inorganic Lewis and Brønsted acids. Furthermore, the use of polyacids, in particular isopolyacids and heteropolyacids and of mixtures of various acids is also possible. For the purposes of the present invention, heteropolyacids are inorganic polyacids having at least two different central atoms which are formed from weak, polybasic oxo acids of a metal (preferably Cr, Mo, V, W) and of a nonmetal (preferably As, I, P, Se, Si, Te) as partial mixed anhydrides. They include, inter alia, 12-molybdophosphoric acid and 12-tungstophosphoric acid.

Particularly preferred dopants according to the invention are sulfuric acid and phosphoric acid. A very particularly preferred dopant is phosphoric acid ($H_3PO_4$).

The degree of doping can be used to influence the conductivity of the polymer membrane of the invention. The conductivity increases with increasing concentration of the dopant until a maximum value is reached. According to the invention, the degree of doping is reported as mol of acid per mole of repeating unit of the polymer. For the purposes of the present invention, a degree of doping of from 3 to 15, in particular from 6 to 12, is preferred.

The property spectrum of the polymer membrane of the invention can be altered by varying its composition. In a preferred embodiment of the present invention, the polymer blend comprises a) from 50 to 99% by weight of a polymer comprising recurring azole units of the formula 1A and/or 1B, in admixture with
b) from 1 to 50% by weight of a polysulfone which has no sulfonic acid groups.

In a particularly preferred embodiment of the present invention, the polymer blend comprises
a) from 70 to 95% by weight of a polymer comprising recurring azole units of the formula 1A and/or 1B, in admixture with
b) from 5 to 30% by weight of a polysulfone which has no sulfonic acid groups.

The doped polymer membrane has a single-layer or multilayer structure. A multilayer structure enables its material properties such as the E modulus, the tensile strength and the proton conductivity to be varied in a desired way. The polymer membrane of the invention preferably comprises at least two layers A and B which are each obtainable from the polymer blend according to the invention and differ from one another in the content of polysulfone b). In addition, it is particularly advantageous for the thicknesses of the two layers A and B also to be different.

According to the invention, particular preference is given to a doped polymer membrane which comprises at least three layers A, B and C which are each obtainable from the polymer blend according to the invention, with the middle layer C differing from the two outer layers A and B in the content of polysulfone b). Variation of the layer thicknesses can likewise be advantageous. In a particularly preferred embodiment of the present invention, the doped polymer membrane comprises three layers A, B and C. Here, the outer layers A and B are thinner than the middle layer C and have a higher content of polysulfone b) than the middle layer C. In a very particularly preferred embodiment of the present invention, the middle layer C contains no polysulfone.

The properties of the polymer membrane of the invention can be controlled to some extent by its total thickness. However, even extremely thin polymer membranes have very good mechanical properties and a low permeability to water and oxygen. They are therefore suitable for use in fuel cells at above 100° C., in particular for use in fuel cells at above 120° C., without the edge region of the membrane electrode unit having to be reinforced. The total thickness of the doped polymer membrane of the invention is preferably in the range from 5 to 100 μm, advantageously from 10 to 90 μm, in particular from 20 to 80 μm.

The polymer membrane of the invention has improved material properties compared to the previously known doped polymer membranes. In particular, it has very good mechanical properties and a low permeability to hydrogen and oxygen. In a particularly preferred embodiment of the present invention, its proton conductivity at room temperature is above 30 mS/cm and its E modulus after 10 minutes at 100° C. is greater than 10 MPa.

Processes for preparing doped polymer membranes are known. In a preferred embodiment of the present invention, they are obtained by wetting a polymer blend according to the invention with concentrated acid, preferably highly concentrated phosphoric acid, for an appropriate time, preferably 0.5-96 hours, particularly preferably 1-72 hours, at temperatures in the range from room temperature to 100° C. and atmospheric or superatmospheric pressure.

For the purposes of the present invention, "polymer blends" are physical mixtures of polymers. Processes for preparing polymer blends are known. They can be obtained, for example, from a solution containing the polymers to be blended by evaporation of the solvent. The evaporation of the solvent is preferably carried out in such a way that a self-supporting and preferably transparent film is obtained. For the purposes of the present invention, N,N-dimethylacetamide, N,N-dimethylformamide, dimethyl sulfoxide, N-methylpyrrolidone or mixtures of these solvents are preferably used.

Possible applications of the doped polymer membranes of the invention include, inter alia, the use in fuel cells, in electrolysis, in capacitors and in battery systems. Owing to their property profile, the doped polymer membranes are preferably used in fuel cells.

The present invention also provides a membrane electrode unit which comprises at least one polymer membrane according to the invention. For further information on membrane electrode units, reference may be made to the technical literature, in particular the patents U.S. Pat. No. 4,191,618, U.S. Pat. No. 4,212,714 and U.S. Pat. No.

4,333,805, whose disclosure is hereby explicitly incorporated by reference into the present patent application. The invention is illustrated below by means of examples and comparative examples, without the invention being restricted to these examples.

1. EXAMPLE a) Preparation of a PBI-DMAc Solution

®Celazole from Celanese is dissolved in N,N-dimethylacetamide (15% by weight of Celazole) at a temperature of 200° C. over a period of 2-4 hours.

b) Preparation of a Polysulfone Solution

Polysulfone ®Radel-R 5700 from Amoco (or polyether sulfone ®Ultrason E 6000 from BASF) is dissolved in N,N-dimethylacetamide or N-methylpyrrolidone (15% by weight). The polysulfone solution is filtered through a pressure filter at room temperature.

c) Preparation of the Polymer Mixture in Solution

The PBI-DMAc solution and the polysulfone solution are mixed by means of a slow-running anchor stirrer at a temperature of 60-95° C. Lower temperatures or high rotational speeds of the stirrer lead, as a result of the Weissenberg effect which is displayed by the polybenzimidazole solution, to at least partial demixing of the solution. The mixed solution is degassed by application of a vacuum for a period of at least 15 minutes at a temperature of 80° C.

d) Production of the Polymer Membrane

The solution is applied in a thickness of about 250 μm by means of a doctor blade to a glass plate in a low-dust environment (laminar flow box) and dried at temperatures of up to 120° C. in a convection drying oven provided with a dust filter. The dried polymer membrane is peeled off from the glass plate.

e) Doping of the Polymer Membrane

The membrane is wetted with 85% strength phosphoric acid for 72 hours at room temperature.

2. COMPARATIVE EXAMPLE

Victrex polyether ketone (PEK) is, as described in DE 19847782 A1 20000420, converted into the sulfonated product. The sulfonated product has a degree of sulfonation of 42%. The sulfonic acid polymer is converted into the sodium salt by stirring overnight in 5% strength aqueous sodium hydroxide at 50° C., filtered off, washed and dried.

The sulfonic acid polymer is dissolved in N,N-dimethylacetamide or N-methylpyrrolidone (15% by weight). The polysulfone solution is filtered through a pressure filter at room temperature.

The dissolution of the polymer is carried out in a manner analogous to 1.b). Conversion of the sodium salt into the free acid is carried out by treatment of the blend membrane with phosphoric acid. The preparation of the polymer mixture in solution, the production of the polymer membrane and the doping of the membrane are carried out by methods analogous to those in the above example.

3. Determination of the Phosphoric Acid Concentration

The doped membranes are stirred overnight in precisely 1 l of distilled water. They are then taken from the water and dried at 150° C. and 20-50 mbar for 3 hours. The dried membranes are weighed. The acid content of the water is determined by titration with a standard solution of sodium hydroxide.

The number of acid molecules per repeating unit of the respective polymer is calculated from the dry mass of the membrane and the titration data. The results obtained are summarized in table 1.

TABLE 1

Degree of doping of the polymer membrane

| Sample | Blending component [%] | $H_3PO_4$/repeating unit of the polymer |
|---|---|---|
| E 1 | 5% PES | 9.26 |
| E 2 | 10% PES | 8.75 |
| E 3 | 20% PES | 8.44 |
| E 4 | 5% PSU | 9.29 |
| E 5 | 10% PSU | 8.92 |
| E 6 | 20% PSU | 7.75 |
| CE 1 | 0% | 9.35 |
| CE 2 | 5% sPEK | 9.85 |
| CE 3 | 10% sPEK | 9.51 |
| CE 4 | 20% sPEK | 8.76 |

E: Example;
CE: Comparative example

4. Measurement of the Conductivity

Measurements were carried out at room temperature by means of a 4-pole arrangement using platinum electrodes (wire, 0.25 mm diameter) and a Zahner IM 6 impedance spectrometer. The spectrum obtained is fitted using a simple model consisting of a parallel circuit, a capacitor and a resistance. The dimensions of the sample were determined prior to doping. The results are shown in table 2.

TABLE 2

Conductivity measurements

| | | Fitting results | | | | Membrane | | | | |
|---|---|---|---|---|---|---|---|---|---|---|
| Sample | Blending component | R [ohm] | Error [%] | $C_{par}$ [pF] | Error [%] | Thickness [cm] | Error [%] | Width [cm] | Error [%] | Conductivity [S/cm] |
| E 1 | 5% PES | 2004 | 2.67 | 102.2 | 23.16 | 3.2E−03 | 1.0 | 3.5 | 3.0 | 0.0891 |
| E 2 | 10% PES | 2293 | 2.45 | 119.7 | 17.39 | 3.1E−03 | 1.0 | 3.5 | 3.0 | 0.0804 |
| E 3 | 20% PES | 2756 | 3.21 | 131.4 | 23.31 | 2.8E−03 | 1.0 | 3.5 | 3.0 | 0.074 |
| E 4 | 5% PSU | 2395 | 1.58 | 120.5 | 18.21 | 3.3E−03 | 1.0 | 3.5 | 3.0 | 0.072 |
| E 5 | 10% PSU | 2392 | 2.77 | 127.9 | 10.64 | 3.3E−03 | 1.0 | 3.5 | 3.0 | 0.072 |
| E 6 | 20% PSU | 2923 | 2.06 | 126.5 | 18.40 | 3.0E−03 | 1.0 | 3.5 | 3.0 | 0.065 |
| CE 1 | 0 | 2091 | 2.72 | 115.9 | 27.52 | 2.9E−03 | 1.0 | 3.5 | 3.0 | 0.094 |

TABLE 2-continued

| | | Conductivity measurements | | | | | | | |
| | | Fitting results | | | | Membrane | | | |
| Sample | Blending component | R [ohm] | Error [%] | $C_{par}$ [pF] | Error [%] | Thickness [cm] | Error [%] | Width [cm] | Error [%] | Conductivity [S/cm] |
|---|---|---|---|---|---|---|---|---|---|---|
| CE 2 | 05% sPEK | 2485 | 1.29 | 122.8 | 20.37 | 2.9E−03 | 1.0 | 3.5 | 3.0 | 0.079 |
| CE 3 | 10% sPEK | 2797 | 0.72 | 123.0 | 15.90 | 2.7E−03 | 1.0 | 3.5 | 3.0 | 0.076 |
| CE 4 | 20% sPEK | 3191 | 2.64 | 129.1 | 16.21 | 3.2E−03 | 1.0 | 3.5 | 3.0 | 0.056 |

E: Example;
CE: Comparative example
PSU (Radel R5700);
PES (Ultrason E6000);
PEK [M420 (Op. 3/99) Na salt]

5. Measurement of the Mechanical Properties

The mechanical properties are determined in a uniaxially tensile test on a Zwick testing machine (100 N load cell). The geometry of the test specimen is determined in the undoped state. The specimen width in the undoped state is 15 mm, and the specimen length between the pneumatically operated chucks is 100 mm. The initial force is 0.1 N, and the test is carried out at a speed of 100 mm/min.

The samples are installed in the sample chamber preheated to 100° C., the sample chamber is closed and the measurement is started after precisely 10 minutes. Table 3 summarizes the results.

TABLE 3

| | Measurement of the mechanical properties | | | |
| Sample | E modulus [MPa] | Fracture toughness [J/m²] | Elongation at $F_{max}$ [%] | $R_{max}$ [N/mm²] |
|---|---|---|---|---|
| E 1 | 8.67 | 37733 | 24.41 | 1.75 |
| E 2 | 8.32 | 32590 | 27.80 | 1.67 |
| E 3 | 8.04 | 47931 | 33.14 | 1.99 |
| E 4 | 7.21 | 41715 | 27.25 | 1.60 |
| E 5 | 9.81 | 22473 | 20.22 | 1.62 |
| E 6 | 22.59 | 190428 | 55.90 | 4.66 |
| E 1 | 7.71 | 23263 | 22.06 | 1.51 |
| CE 2 | 8.27 | 47650 | 33.08 | 1.97 |
| E 3 | 7.52 | 37561 | 27.87 | 1.93 |
| CE 4 | 6.65 | 47483 | 38.68 | 1.72 |

E: Example;
CE: Comparative example
$F_{max}$: Maximum force in the tensile stress/elongation curve
$R_{max}$: Ultimate tensile strength

What is claimed is:

1. An acid-doped, single-layer or multilayer polymer membrane comprising at least one layer A of a polymer blend comprising:

a) from 0.1 to 99.9% by weight of one or more polymers comprising recurring azole units of the formula 1A and/or 1B:

(1A)

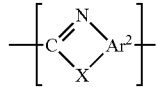
(1B)

wherein the radicals Ar, Ar¹ and Ar² are tetravalent, divalent or trivalent aromatic or heteroaromatic groups and the radicals X, which are identical within a repeating unit, are each an oxygen atom, a sulfur atom or an amino group bearing a hydrogen atom, a group having 1-20 carbon atoms, in admixture with b) from 99.9 to 0.1% by weight of a polysulfone comprising recurring units of the formula 2A, 2B, 2C, 2D, 2E, 2F and/or 2G and having no protonated sulfonic acid groups —SO3H or no protonable sulfonic acid salt groups of the formula —SO₃M⁺, wherein M⁺ is an inorganic or organic cation:

—O—R—SO₂—R— (2A)

—O—R—SO₂—R—O—R— (2B)

—O—R—SO₂—R—O—R—R— (2C)

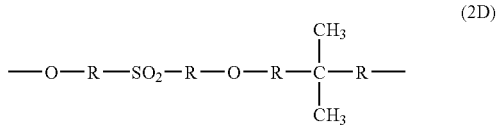
(2D)

—O—R—SO₂—R—R—SO₂—R— (2E)

—O—R—SO₂—R—R—SO₂—R—O—R—SO₂—] (2F)

[O—R—SO₂—R][SO₂—R—R]— (2G), wherein the radicals R are identical or different and are each, independently of one another are 1,2-phenylene, 1,3-phenylene, 1,4-phenylene, 4,4'-biphenyl, a divalent radical of a heteroaromatic, a divalent radical of a $C_{10}$-aromatic or a divalent radical of a $C_{14}$-aromatic and wherein the polymer(s) comprising recurring azole units of the formula 1A and/or 1B are acid doped with a Lewis or Brønsted acid.

2. The doped polymer membrane as claimed in claim 1, wherein X, which are identical within a repeating unit are each an oxygen atom, a sulfur atom or an amino group bearing a hydrogen atom, a branched or unbranched alkyl, alkoxy group or an aryl group.

3. The doped polymer membrane as claimed in claim 2, wherein the number of recurring azole units in the polymer is greater than or equal to 100.

4. The doped polymer membrane as claimed in claim 1, wherein the number of recurring azole units in the polymer is greater than or equal to 10.

5. The doped polymer membrane as claimed in claim 1, wherein the polymer a) is a polymer comprising recurring beuzimidazole units of the formula 1C):

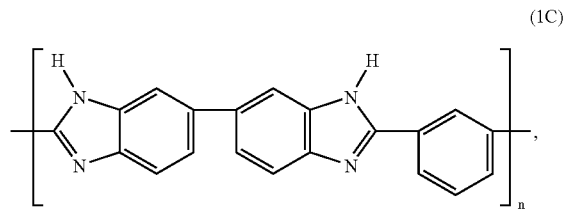

wherein n is an integer greater than or equal to 10.

6. The doped polymer membrane as claimed in claim 5, wherein the polymer blend comprises a) from 50 to 99% by weight of a polymer comprising recurring azole units of the formula 1A and/or 1B, in admixture with b) from 1 to 50% by weight of a polysulfone comprising recurring units of the formula 2A, 2B, 2C, 2D, 2E, 2F and/or 2G which has no sulfonic acid groups.

7. The doped polymer membrane as claimed in claim 1, wherein the polysulfone is one of the following formulas:

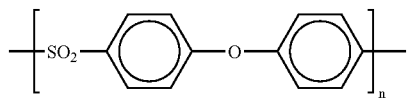

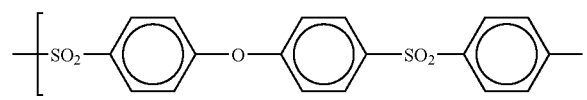

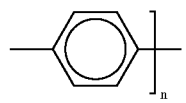

-continued

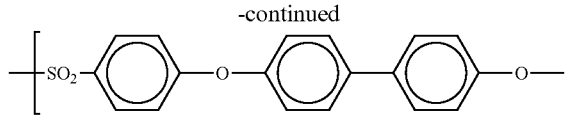

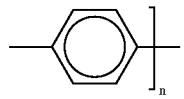

wherein n is greater than 0.

8. The doped polymer membrane as claimed in claim 1, wherein the polysulfone is

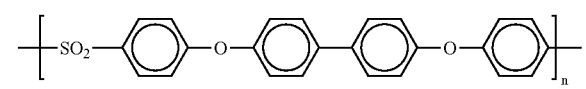

wherein n is greater than 0.

9. The doped polymer membrane as claimed in claim 8, which is doped with hydrochloric acid, sulfuric acid and/or phosphoric acid.

10. The doped polymer membrane as claimed in claim 1, which comprises at least two layers A and B which are each obtained from a polymer blend as defined in claim 1 and differ from one another in the content of polysulfone b) and in their thickness.

11. The doped polymer membrane as claimed in claim 1, which comprises at least three layers A, B and C wherein layers A and B each obtained from a polymer blend as defined in claim 1, with the middle layer C differing from the two outer layers A and B in the content of polysulfone b).

12. The doped polymer membrane as claimed in claim 11, wherein the middle layer C contains no polysulfone b).

13. The doped polymer membrane as claimed in claim 1, which has a total thickness of from 5 to 100 μm.

14. The doped polymer membrane as claimed in claim 1, whose proton conductivity at room temperature is above 30 mS/cm and whose E modulus after 10 minutes at 100° C. is greater than 10 MPa.

15. A process for producing a doped polymer membrane as claimed in claim 1, which comprises wetting a polymer blend as defined in claim 1 with phosphoric acid at temperatures in the range from room temperature to 100° C. and atmospheric or superatmospheric pressure.

16. An article which comprises the doped polymer membrane as claimed in 1, wherein said article is used in fuel cells, in electrolysis, in capacitors or in battery systems.

17. A fuel cell comprising the membrane as claimed in claim 1.

18. A membrane electrode unit comprising at least one polymer membrane as claimed in claim 1.

19. The doped polymer membrane as claimed in claim 1, wherein the polysulfone is one of the following formulas:
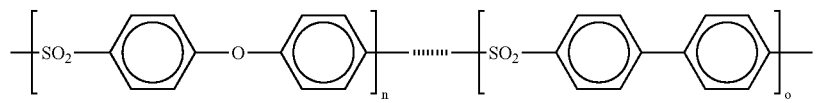
10
where n>0
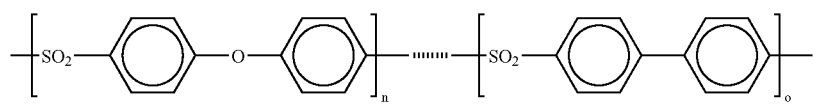
20
where n<0
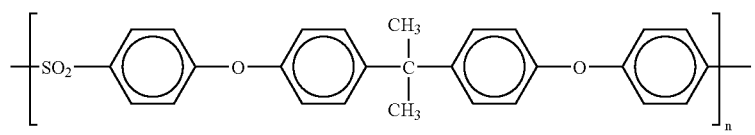
wherein n is greater than 0.
20. The doped polymer membrane as claimed in claim 1, which is doped with phosphoric acid.
* * * * *

UNITED STATES PATENT AND TRADEMARK OFFICE
CERTIFICATE OF CORRECTION

PATENT NO. : 7,285,325 B2 Page 1 of 1
APPLICATION NO. : 10/399514
DATED : October 23, 2007
INVENTOR(S) : Thomas Guth et al.

It is certified that error appears in the above-identified patent and that said Letters Patent is hereby corrected as shown below:

In the Claims:

In Claim 1, in column 11, on line 65,

" 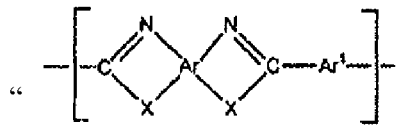 (1A) " should read

-- 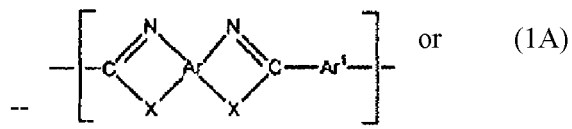 or (1A) --.

In Claim 2, in column 13, on line 2, "wherein X, which are identical within a repeating unit are", should read -- wherein X, which are identical within a repeating unit, are --.

Signed and Sealed this

Twenty-fifth Day of March, 2008

JON W. DUDAS
*Director of the United States Patent and Trademark Office*